US006311904B1

(12) United States Patent
Leturmy et al.

(10) Patent No.: US 6,311,904 B1
(45) Date of Patent: Nov. 6, 2001

(54) APPARATUS AND PROCESS FOR GRINDING CLOSED CONTAINERS THAT CONTAIN A POWDER

(75) Inventors: Marc Leturmy, La Queue-les-Yvelines; Frédéric Pioger, Chaville; Richard Soula, Vertou, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/357,411

(22) Filed: Jul. 20, 1999

(30) Foreign Application Priority Data

Aug. 5, 1998 (FR) .................................................. 98 10053

(51) Int. Cl.[7] ..................................................... B02C 19/12

(52) U.S. Cl. ................................ 241/18; 241/30; 241/31; 241/33

(58) Field of Search ................................ 241/31, 33, 30, 241/18, DIG. 14

(56) References Cited

U.S. PATENT DOCUMENTS 4,378,851 * 4/1983 DeVries ................................ 241/31
5,205,495 4/1993 Garnier .
5,233,932 * 8/1993 Robertson ............................. 241/31

FOREIGN PATENT DOCUMENTS 88 05 008 6/1988 (DE) .
195 20 365 12/1996 (DE) .
195 35 554 4/1997 (DE) .
0 244 074 11/1987 (EP) .
1 485 448 9/1977 (GB) .
05 015807 1/1993 (JP) .

* cited by examiner

*Primary Examiner*—Mark Rosenbaum
(74) *Attorney, Agent, or Firm*—Burns, Doane, Swecker & Mathis, L.L.P.

(57) ABSTRACT

Provided is an apparatus for grinding containers that contain a powder. The apparatus includes (i) a grinder, (ii) an enclosure for confinement of the powder released during grinding, (iii) a supply of an inert atmosphere, and (iv) a conduit which directs the inert atmosphere from the supply into the enclosure. Also provided is a process for grinding containers that contain a powder, the grinding being carried within an atmosphere of an enclosure.

30 Claims, 2 Drawing Sheets

APPARATUS AND PROCESS FOR GRINDING CLOSED CONTAINERS THAT CONTAIN A POWDER

BACKGROUND OF THE INVENTION (i) Field of the Invention

The present invention relates to an apparatus for grinding containers that contain a powder, such as, for example, cartridges of toner for photocopiers or laser printers, this apparatus including a grinder placed in an enclosure for confinement of the powder released during grinding.

(ii) Description of Related Art

For the purpose of recycling emptied photocopier toner cartridges, one technique commonly employed consists in grinding them in a grinding apparatus which includes a grinder placed in a confinement enclosure and in sucking out the residual powder released during grinding through one or more openings made in the wall of the confinement enclosure by means of a suction system in order to recover the toner powder.

However, in known apparatuses, the toner powders, which generally have a particle size of less than 500 micrometers, are mixed with the ambient air and are partly in suspension in the confinement enclosure, thus creating, under certain conditions, a flammable and/or explosive mixture.

At the present time, in order to prevent the risks of a fire and/or an explosion, there is a requirement to limit the amount of cartridges ground per unit time and to equip the known apparatuses with a powerful, and costly, ventilation system. Furthermore, before grinding, the cartridges usually undergo a preliminary manual step of draining off the residual toner.

Despite these efforts, it has been found that the risks of an explosion and/or a fire are not fully under control.

SUMMARY OF THE INVENTION

The invention is aimed at alleviating these various drawbacks by proposing a grinding apparatus which is safer in operation and allows a larger number of containers to be treated per unit time, while eliminating the preliminary manual step of draining the containers.

For this purpose, the subject of the invention is an apparatus for grinding containers that contain a powder, which includes a grinder placed in an enclosure for confinement of the powder released during grinding, this apparatus furthermore conditioning the atmosphere in the confinement enclosure with an inert gas whose nitrogen content is greater than approximately 90% by volume.

The grinding apparatus according to the invention may also include one or more of the following characteristics:

- the nitrogen content of the inert gas is approximately 95% by volume;
- the oxygen content of the inert gas is less than approximately 5% by volume;
- the atmosphere is conditioned using a supply of the inert gas and a conduit for introducing the inert gas into the confinement enclosure;
- the inert gas supply is preferably a plant for producing nitrogen by a membrane-type air separation process;
- the plant for producing the inert gas by a membrane process comprises, apart from a membrane-type air separator feeding a buffer tank from which the confinement enclosure is fed with inert gas, a backup tank of liquid nitrogen;
- a throttling device, configured so as to be normally open in operation (an expression familiar to those skilled in the art, meaning the the device, for example a solenoid valve, is open, i.e., fluid can flow- should there be no electricity), is placed in the gas line connecting the buffer tank to the confinement enclosure;
- the confinement enclosure includes an inlet for the containers and an outlet for the ground containers in order to allow continuous grinding, and the apparatus furthermore includes, by the inlet, an airlock for introducing the containers so as to prevent the ambient air from entering the confinement enclosure and, at the outlet, a suction device for extracting the powder released during grinding;
- the containers are introduced into the confinement enclosure via a conveyor, the airlock surrounding the conveyor and including injectors, for injecting the inert gas, which are placed on each side of the conveying belt of the conveyor;
- a sensor which measures the oxygen content of the atmosphere in the confinement enclosure and a regulator which regulates the flow rate of inert gas introduced by the supply depending on the oxygen content measured by the sensor;
- a comparator which compares the oxygen content of the atmosphere in the confinement enclosure, measured by the sensor, with a predetermined threshold and an alarm actuated by the comparator when the measured oxygen content of the atmosphere in the confinement enclosure exceeds a predetermined threshold.

The invention also relates to a process for grinding containers that contain a powder, using a grinder placed in an enclosure for confinement of the powder released during grinding, and further comprising the step of conditioning the atmosphere in the confinement enclosure with an inert gas whose nitrogen content is greater than approximately 90% by volume.

The process according to the invention may also adopt one or more of the following characteristics:

- the oxygen content of the inert gas is less than approximately 5% by volume;
- the conditioning step is carried out by supplying the confinement enclosure from a supply of inert gas, which supply is a plant for producing nitrogen by a membrane-type air separation process;
- the membrane-type nitrogen production plant comprises, apart from a membrane-type air separator feeding a buffer tank from which the confinement enclosure is fed with inert gas, a backup tank of liquid nitrogen;
- the confinement enclosure is fed with inert gas from the buffer tank via a throttling device located in the gas line connecting the buffer tank to the confinement enclosure, which throttling device is configured so as to be normally open in operation;
- if the grinder has to be suddenly stopped in an emergency, the confinement enclosure continues to be fed with inert gas from the buffer tank because of the fact that the throttling device is configured so as to be normally open in operation;
- the oxygen content of the atmosphere in the confinement enclosure is measured and the oxygen content of the atmosphere thus measured is compared with a predetermined threshold, and an alarm is provided which is capable of being actuated, depending on the result of the comparison, when the measured oxygen content of the atmosphere in the confinement enclosure exceeds a predetermined threshold;

the oxygen content of the atmosphere in the confinement enclosure is measured and the flow rate of inert gas introduced is regulated depending on the oxygen content thus measured;

the confinement enclosure is fed according to the following procedure;

i) under normal operating conditions, the confinement enclosure is fed with inert gas at a maintain flow rate $Q_m$ from the buffer tank;

ii) the oxygen content of the atmosphere in the confinement enclosure is measured continuously;

iii) as soon as a limit threshold $S_1$ for the measured oxygen content is exceeded, the containers to be ground stop being introduced into the grinder and the confinement enclosure is fed with inert gas at a purge flow rate $Q_p$ from the backup tank of liquid nitrogen so as to be able to bring the measured oxygen content in the confinement enclosure back down to the $S_1$ level or below it, $Q_p$ being greater than $Q_m$;

iv) as soon as the measured oxygen content in the confinement enclosure has returned to the $S_1$ level or below it, normal operating conditions are resumed in which the confinement enclosure is fed with inert gas at the maintain flow rate $Q_m$ from the buffer tank and the containers to be ground start being introduced into the grinder again;

v) if application of the purge flow rate $Q_p$ does not succeed in bringing the measured oxygen content in the confinement enclosure back down, as described in step iv), the grinder is then stopped.

It will be understood that, like in any industrial plant, the grinder may suddenly stop for many reasons, including the fact that, for one reason or another, the electricity on the site is or has to be cut off.

Further characteristics and advantages of the invention will emerge from the following description, given by way of example, and the drawings, without a limiting character.

DETAILED DESCRIPTION OF PREFERRED EMBODIMENTS

Figure 1:
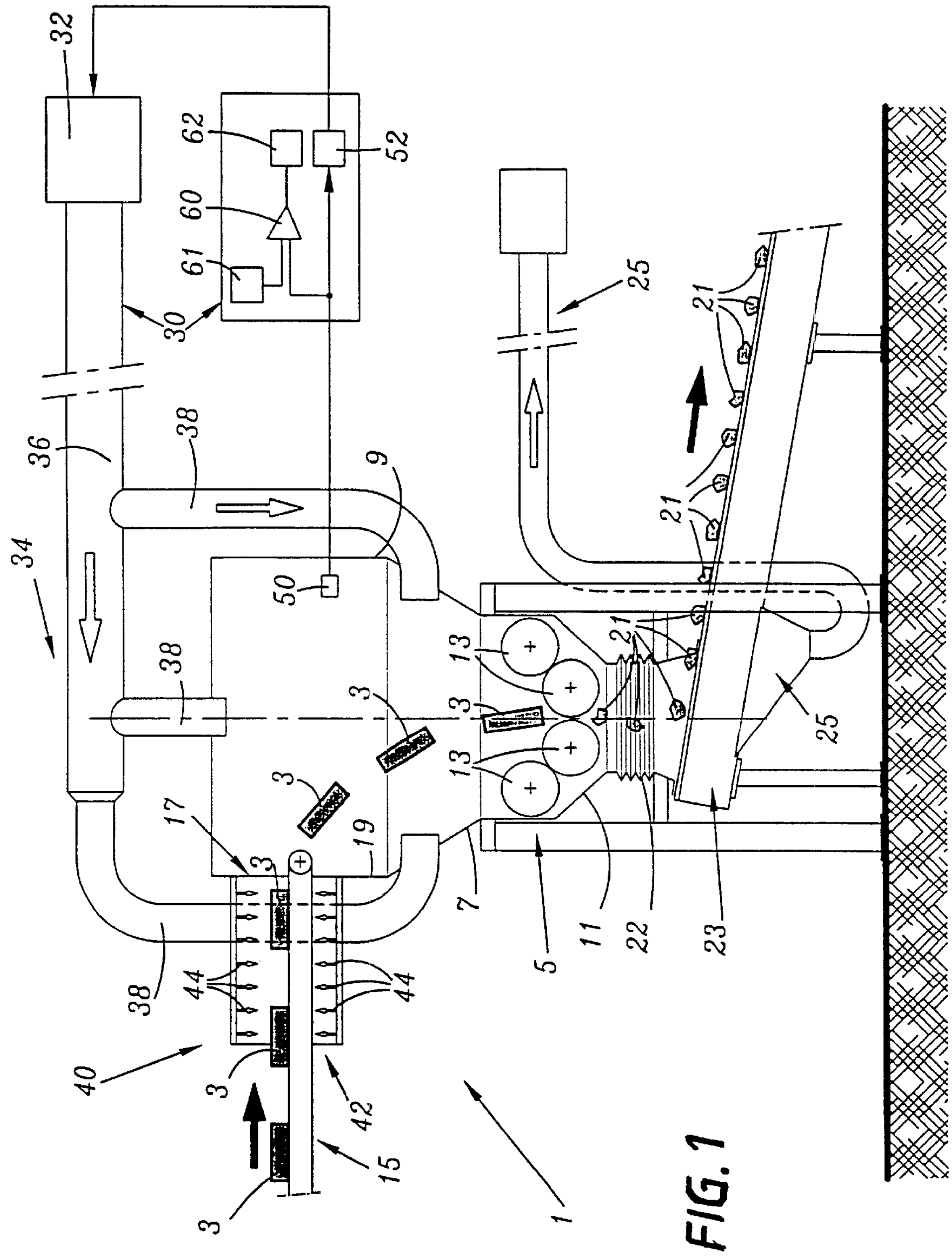
FIG. 1 shows a diagram of a grinding apparatus according to the invention.

FIG. 1 illustrates diagrammatically an apparatus 1 for grinding containers 3 that contain a powder, such as, for example, toner cartridges for photocopiers or laser printers.

This apparatus 1 includes a grinder 5 placed in an enclosure 7 for confinement of the powder released during grinding. This enclosure 7 is divided into a hopper 9 and an actual grinding chamber 11 in which the grinding drums 13 of the grinder 5 are fitted.

The apparatus 1 is charged via a conveyor 15, for example a conveyor belt. In order to introduce the containers 3 to be ground, this conveyor 15 projects into the hopper 9 through an opening 17 made in a side wall 19 of the hopper 9.

Downstream of the grinding drums 13, the fragments 21 of ground containers drop through an output bellows 22 onto an inclined vibrating grid 23 allowing the ground fragments 21 to be removed and allowing the toner leaving the bellows 22 to be recovered by means of a suction system 25 placed beneath the grid 23.

Moreover, the grinding apparatus 1 includes components 30 for conditioning the atmosphere in the enclosure 7 with an inert gas whose nitrogen content is greater than approximately 90% by volume, preferably equal to approximately 95% by volume, in order to prevent the risks of a fire and/or an explosion.

In addition, the oxygen content of the inert gas is advantageously less than approximately 5% BY VOLUME. This will have been understood on reading all of the foregoing that the oxygen content of the inert gas will depend on the characteristics of the powder contained in the containers, especially in terms of particle size and explosiveness.

The conditioning components 30 include a supply 32 of the inert gas and a conduit 34 for introducing the inert gas into the enclosure 7.

Advantageously, the supply 32 is a plant for producing the inert gas by a membrane-type air separation process, thereby allowing an inert gas to be delivered to the enclosure 7 at a reduced cost. However, it is possible, of course, to use any other supply of gas such as, for example, storage tanks or cryogenic plants for producing an inert gas having the characteristics described above.

The conduit 34 is, for example, formed by a central duct 36 from which the secondary ducts 38 branch off and emerge at different places in the enclosure 7.

In order to prevent the surrounding air from entering via the opening 17 into the enclosure 7, an airlock 40 surrounding the conveyor 15 is provided.

Advantageously, the airlock 40 includes at least one flexible curtain 42, for example formed from rubber fringes, which flexible curtain is placed at the inlet of the airlock 40, and injectors 44, for injecting laminar jets of the inert gas,placed on each side of the conveying belt of the conveyor 15.

Furthermore, the conditioning components 30 include a sensor 50 for measuring the oxygen content of the atmosphere in the enclosure 7 and, connected to this sensor 50, a regulator 52 for regulating the flow rate of inert gas introduced by the supply 32 depending on the measured oxygen content of the atmosphere inside the enclosure 7. Thus, when the oxygen content increases, the regulator 52 instructs the supply 32 to increase the flow of gas introduced into the enclosure 7.

Moreover, the conditioning components 50 include, connected to the sensor 30, a comparator 60 for comparing the oxygen content of the atmosphere, measured by the aid of the sensor 50, with a predetermined threshold, recorded in a memory 61, and an alarm 62 actuated by the comparator 60 when the measured oxygen content of the atmosphere exceeds the predetermined threshold. This allows the safety of the apparatus according to the invention to be increased even further.

By virtue of the means 30 for conditioning the atmosphere in the enclosure 7 with an inert gas, the number of containers ground per unit time can be significantly increased, while at the same time reducing the risks of a fire or an explosion, this being achieved without requiring the manual container-draining step commonly carried out at the present time.

Figure 2:
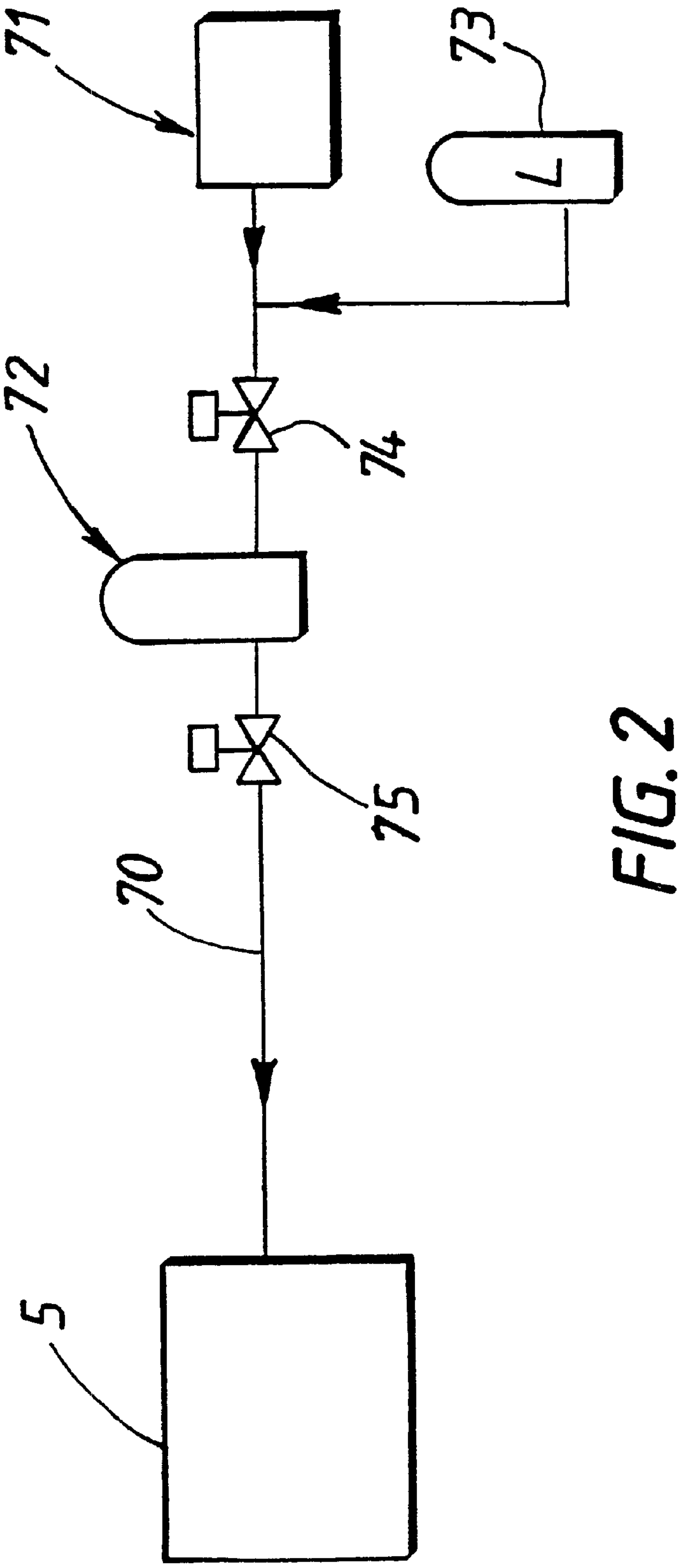
FIG. 2 is a diagrammatic illustration of an overall plant including a grinding apparatus according to the invention, such that it is fed with inert gas from a membrane-type air separator.

As regards FIG. 2, this is a diagrammatic illustration of an overall plant including a grinding apparatus 5 according to the invention, which that it is fed with inert gas from a membrane-type air separator. This overall plant then comprises the following elements;

the grinder 5 is fed with gas via a gas line 70, from a buffer tank 72, which is itself fed with gas via the membrane-type air separator 71. The operation of such separators, and especially the cycles of filling the buffer tank 72, are well known to those skilled in the art and will therefore not be repeated here;

it should also be noted in the figure that there is a backup tank 73 of liquid nitrogen making it possible not only to supply gas to the grinder 5 even in the event of shutdown or malfunction of the separator 71, but also to use this nitrogen, of cryogenic origin (and therefore of greater purity than that produced by the separator 71), to purge the confinement enclosure at the flow rate $Q_p$, as described above;

the plant furthermore comprises, in the line 70 between the buffer tank 72 and the grinder 5, a "normally open" solenoid valve 75 (which is therefore open should there be no electricity), this solenoid valve being particularly advantageous according to the invention because of the fact that it allows, should the electricity supplied to the site or to the grinder be suddenly cut off, the inert gas to continue to be fed into the grinder, at least during a time corresponding to the filling level of the tank 72 at the moment when the sudden cutoff happened;

the plant also comprises, upstream of the tank 72, a stop valve (which is manual or automatic, and generally "normally closed").

What is claimed is:

1. An apparatus for grinding containers that contain a powder comprising:

(i) a grinder for grinding said containers into container fragments;

(ii) an enclosure for confinement of said powder released during grinding comprising a suction device for extracting powder released during grinding;

(iii) a supply of an inert atmosphere;

(iv) a conduit which directs said inert atmosphere from said supply into said enclosure.

2. The apparatus according to claim 1, wherein said supply is of a nitrogen atmosphere.

3. The apparatus according to claim 2, wherein said supply is of an atmosphere comprising a nitrogen content of approximately 90% by volume.

4. The apparatus according to claim 3, wherein said supply is of an atmosphere comprising an oxygen content of less than approximately 5% by volume.

5. The apparatus according to claim 2, wherein said supply is a plant for producing an inert gas by a membrane-type air separation process.

6. The apparatus according to claim 5, wherein said plant for producing an inert gas comprises:

(i) a membrane-type air separator;

(ii) a buffer tank which is fed inert gas from said membrane-type air separator;

(iii) a gas line which directs inert gas from said buffer tank to said confinement enclosure; and (iv) a backup tank comprising liquid nitrogen.

7. The apparatus according to claim 1, further comprising (i) a sensor for measuring oxygen content of the atmosphere in said confinement enclosure;

(ii) a regulator for regulating the flow rate of inert gas introduced by said supply depending on the oxygen content measured by said sensor.

8. The apparatus according to claim 7, further comprising:

(i) a comparator which compares the oxygen content of the atmosphere in said confinement enclosure, measured by said sensor, with a predetermined threshold; and (ii) an alarm actuated by said comparator when the oxygen content measured in the atmosphere in said confinement enclosure exceeds a predetermined threshold.

9. The apparatus according to claim 1 further comprising an inclined vibrating grid which removes said container fragments from said enclosure.

10. An apparatus according to claim 1, wherein the containers are toner cartridges and the powder is a toner.

11. An apparatus for grinding containers that contain a powder comprising:

(i) a grinder;

(ii) an enclosure for confinement of said powder released during grinding; and (iii) a supply of a nitrogen atmosphere, wherein said supply is a plant for producing the nitrogen by a membrane-type air separation process comprising:

(a) a membrane-type air separator;

(b) a buffer tank which is fed nitrogen gas from said membrane-type air separator;

(c) a gas line which directs nitrogen from said buffer tank to said confinement enclosure, said gas line further comprising a throttle, configured to be open in normal operation; and (d) a backup tank comprising liquid nitrogen.

12. An apparatus for grinding containers that contain a powder comprising:

(i) a grinder;

(ii) an enclosure for confinement of said powder released during grinding comprising;

(a) an inlet for said containers;

(b) an outlet for said ground containers in order to allow continuous grinding;

(c) an airlock by the inlet for introducing said containers so as to prevent entry of ambient air into said confinement enclosure; and (d) a suction device for extracting powder released during grinding;

(iii) a supply of an inert atmosphere; and (iv) a conduit which directs said inert atmosphere from said supply into said enclosure.

13. The apparatus according to claim 12 wherein said airlock comprises a flexible curtain through which said containers enter said airlock.

14. The apparatus according to claim 12, further comprising a conveyor which introduces the containers into said confinement enclosure.

15. The apparatus according to claim 14, wherein said conveyor comprises a conveyor belt and is surrounded by said airlock, said airlock further comprising one or more injectors, placed on each side of said conveyor belt, which inject the inert gas.

16. A process for grinding containers that contain a powder into container fragments, said grinding being carried within an atmosphere of an enclosure, wherein the process comprises the steps of:

(i) introducing said containers into a grinder inside a confinement enclosure which confines powder released during said grinding;

(ii) conditioning the atmosphere in the confinement enclosure by introducing an inert gas; and (iii) extracting with a suction device powder released during said grinding.

17. The process according to claim 16 further comprising the step of:

(iii) removing said container fragments from said enclosure using an inclined vibrating grid.

18. The process according to claim 16 wherein said introducing in step (i) comprises introducing said containers through an airlock into said grinder inside said confinement enclosure, wherein said airlock prevents ambient air from entering said enclosure.

19. The process according to claim 18 wherein said airlock comprises a flexible curtain through which said containers are introduced.

20. The process according to claim 16, wherein the containers are toner cartridges and the powder is a toner.

21. The process according to claim 16, wherein said inert gas comprises a nitrogen content of greater than approximately 90% by volume.

22. The process according to claim 21, wherein said inert gas comprises a content of oxygen of less than approximately 5% by volume.

23. The process according to claim 21, further comprising the step of producing said inert gas by a membrane-type air separation process and supplying said inert gas to said confinement enclosure.

24. The process according to claim 23, further comprising the steps of:

(i) feeding said inert gas produced by the membrane-type air separation process to a buffer tank;

(ii) feeding said inert gas from said buffer tank to said confinement enclosure; and (iii) if necessary supplementing said inert gas with nitrogen from a backup tank containing liquid nitrogen.

25. The process according to claim 24, further comprising the step of feeding the inert gas from said buffer tank via a throttling device prior to feeding said inert gas into said confinement enclosure and configuring said throttling device so as to be normally open in operation.

26. The process according to claim 16, further comprising the steps of:

(i) measuring the oxygen content of the atmosphere in the confinement enclosure;

(ii) comparing the measured oxygen content with a predetermined threshold;

(iii) actuating an alarm if the measured oxygen content of the atmosphere in the confinement enclosure exceeds the predetermined threshold.

27. The process according to claim 16, further comprising the steps of:

(i) measuring oxygen content of the atmosphere in the confinement enclosure; and (ii) regulating flow rate of the inert gas introduced into the confinement chamber depending on the measured oxygen content.

28. The process according to claim 24, further comprising the steps of:

(i) feeding the confinement enclosure with the inert gas at a maintenance flow rate $Q_m$ from said buffer tank under normal operating conditions;

(ii) continuously measuring the oxygen content in the atmosphere in the confinement enclosure;

(iii) discontinuing said step of introducing the containers into the grinder as soon as exceeding a limit threshold level $S_1$ for the measured oxygen content in the confinement enclosure and feeding the confinement enclosure with inert gas at a purge flow rate $Q_p$ from said backup tank of liquid nitrogen so as to be able to reduce the measured oxygen content in the confinement enclosure down to or below the level $S_1$, wherein $Q_p$ is greater than $Q_m$;

(iv) resuming normal operating conditions of feeding the confinement enclosure with inert gas at the maintenance flow rate $Q_m$ from said buffer tank and resuming the step of introducing the containers into the grinder as soon as the measured oxygen content in the confinement enclosure returns to the $S_1$ level or below it.

29. A process for grinding containers that contain a powder into container fragments, said grinding being carried within an atmosphere of an enclosure, wherein the process comprises the steps of:

(i) introducing said containers into a grinder inside a confinement enclosure which confines powder released during said grinding;

(ii) producing an inert gas by a membrane-type air separation process, said inert gas comprising a nitrogen content of greater than approximately 90% by volume;

(iii) feeding said inert gas produced by the membrane-type air separation process to a buffer tank;

(iv) conditioning the atmosphere in the confinement enclosure by introducing therein the inert gas from said buffer tank via a throttling device and configuring said throttling device so as to be normally open in operation wherein, if said grinder stops, said throttling device remains open so as to permit continued feeding of said inert gas from said buffer tank into said confinement enclosure; and (v) if necessary supplementing said inert gas with nitrogen from a backup tank containing liquid nitrogen.

30. The process according to claim 29, further comprising the step of stopping the grinder if said step of feeding the confinement enclosure with inert gas at the purge flow rate $Q_p$ does not succeed in reducing the measured oxygen content in the confinement enclosure down to or below the $S_1$ level after a predetermined time.

* * * * *